Sept. 27, 1932.   G. B. REED   1,879,492
DEMOUNTABLE WHEEL
Filed Oct. 9, 1929

INVENTOR.
GEORGE B. REED.
BY
*John P. Tarbox*
ATTORNEY.

Patented Sept. 27, 1932

1,879,492

UNITED STATES PATENT OFFICE

GEORGE B. REED, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

DEMOUNTABLE WHEEL

Application filed October 9, 1929. Serial No. 398,294.

Two forms of my invention are shown in the accompanying drawing.

Figure 1:
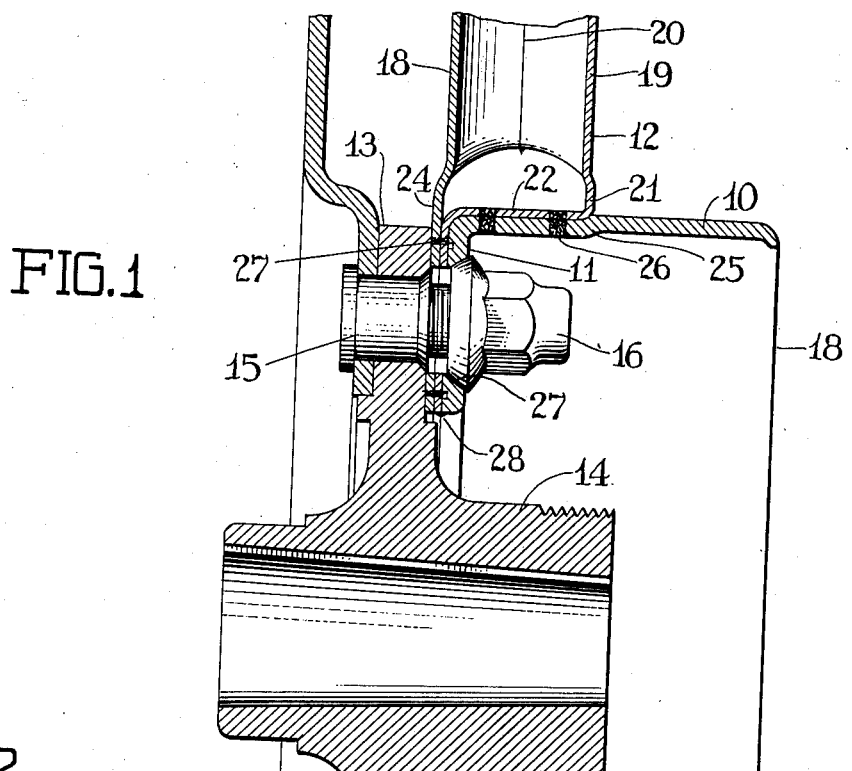

The form of Figure 1 is shown as an axial cross section of a wheel with those parts beyond the roots of the spokes cut away.

Figure 2:
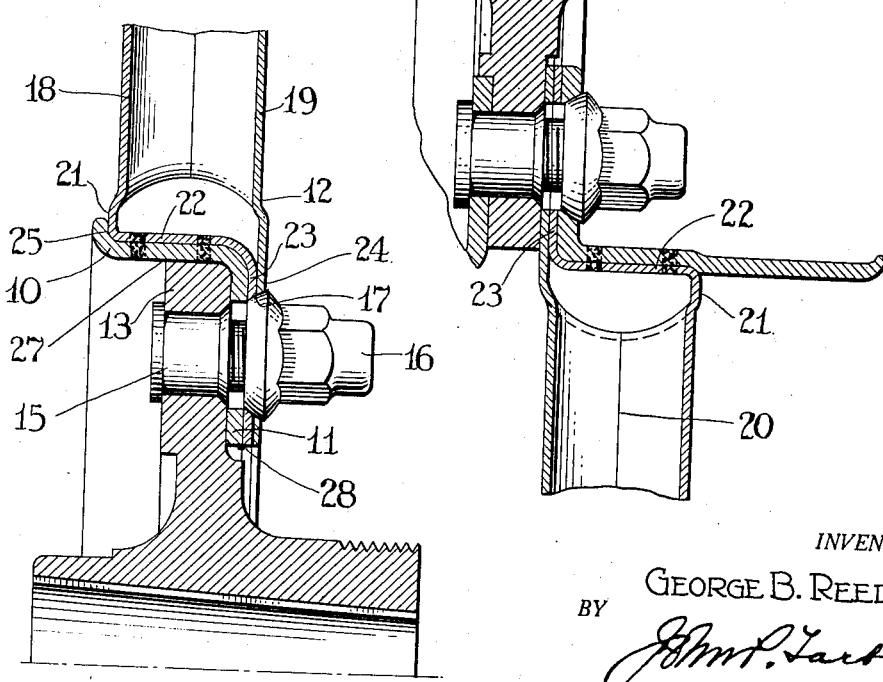

The form of Figure 2 is shown in similar cross section but the showing is confined to the part lying on one side of the wheel axis only.

In general, the demountable artillery wheel of my invention comprises a hub shell provided interiorly with means to demountably secure the wheel in place, in combination with an artillery wheel spoke body carried on the periphery of the shell. The wheel body is rigidly secured to the periphery of the shell and is demountably secured to the hub through the shell and a demountable securing means on its interior. The demountable securing means is preferably in the form of an inwardly projecting flange or ring in the shell as is usual in large diameter hub shells which encompass the securing studs and nuts of the demountable wheel. In the two forms which I show, the wheel body is a metal spoke wheel body formed of unitary stampings each of a half of a wheel as divided in the plane of tread of the wheel. These halves are flash welded together in one well known method of making such wheels. These main bodies are welded to the periphery of the hub shell. Flanges of the stamping are extended inwardly complemental to the inwardly projecting flange of the hub shell and coact therewith in the mounting of the wheel.

In the drawing the hub shell is designated 10, the inwardly projecting flange which constitutes the demountable securing means of the hub shell 11, and the spoked wheel body in general 12. The wheel is shown demountably attached to the radially extending flange 13 of a hub 14 of usual form by means of securing studs 15 and nuts 16 which latter engage seats 17 in the flange 11. This applies both to the forms of Figs. 1 and 2.

The hub shell in the form of Fig. 1 is substantially cylindrical and of a diameter sufficient to encompass with ample clearance for operation from the open end 18 of the hub shell, the securing nuts 16. It may, of course, be given any contour and cross section desired, and there are very many such contours and cross sections in the present popular enlarged hub shells. The securing flange 11 is integrally formed. It may or may not be so formed and may be formed separately and welded or otherwise secured to the hub 10 in accordance with well known present day practice. So also, its contour and curvature may be varied in accordance with any of the well known forms. Its inner face, however, is contoured and shaped in a manner to seat appropriately for the form of flange used directly or indirectly upon the seating face of the radial flange 13 of the hub 14.

As stated, the invention is particularly adaptable to metal spoked artillery wheels. It is so illustrated. The halves 18 and 19 of this wheel as divided in the plane of tread along line 20 constitute unitary stampings. They are flash welded together along the line 20. The outer half 19 has its nave portion 21 provided with an axially inwardly extended annular shell seating flange 22. This flange is provided with an integral radial extension 23 overlapping complementally the securing flange 11. The inner stamping 18 of the wheel has its nave portion 24 extended radially inwardly to complementally overlap the extension 23 and to bear directly upon the mounting face of the hub flange 13.

The shell 10 is provided with a shoulder 25 intermediate its ends. Nave 21 is forced over the inner end of the shell to make a snug fit thereon and up against the shoulder 25. The annular seating flange 22 is welded as at 26 or otherwise secured to the shell. The zone between the shoulder 25 and the inner end of the shell may be called the wheel body seating zone of the shell. Extensions 23 and 24 of the wheel body stampings are welded, or otherwise secured, to each other as at 27, and if desired, also welded or otherwise secured as at 28 to the securing flange 11. The securing nuts 16 firmly yet demountably clamp the structure in place upon the radial hub flange 13.

In the form of Fig. 2, the parts 22 and 23 are connected with the inner stamping 18 instead of with the outer stamping 19, while the part 24 is connected with the outer stamping. In other words, the arrangement of the seating flange 22 and the extensions 23 and 24 is reversed as respects the inside and outside of the wheel body. So too, is the relative arrangement of the main body and the securing flange 11 of the shell 10, this securing flange 11 being on the outside end of the shell instead of the inside. The shell itself is foreshortened and is of a length approximating the thickness of the nave 21 of the wheel. Its inner edge is upturned to constitute shoulder 25. Its outer end through the flange 11 bears against the seating face of the hub flange 13. Its inner periphery 27 fits over the outer periphery of the flange 13 and constitutes a mounting surface in addition to the outer face of the flange 13. Seat 17 for the securing nuts 16 is formed in the extensions 23 and 24 of the wheel body. This form of the invention is adapted especially for mounting the wheel by exposed studs and nuts 15 and 16 located exteriorly of the shell 10. Simply done, the reversal of the arrangement of the parts and the foreshortening of the shell accomplishes this result. It also enables a shifting of the medial plane of the spokes or a shifting of the plane of tread of the wheel or both as may be desired.

Such a construction has numerous advantages. Some of them have been mentioned. Outstanding among those not mentioned are the achievement of a strong and durable mounting structure for artillery spoke wheels composed of sheet metal stampings, and the achievement of such simplicity and economy of parts and their assembly as to greatly reduce the cost of manufacture of wheels of this type. The aggregate gain to the industry and the public in these achievements and others is probably very great and without doubt sufficient to invite very considerable modification and improvement. Each and all of these falling within the purview of my invention should be protected to me by the annexed claims.

What I claim as new and useful and desire to protect by Letters Patent is:

1. An artillery wheel comprising a metal wheel body and a hub shell comprising an axially extending main body and a radially inwardly extending securing flange, said wheel body being secured directly to both the main body and the securing flange of said hub shell.

2. An artillery wheel comprising a metal wheel body and a demountably secured hub shell comprising an axially extending main body and a radially inwardly extending securing flange, said wheel body being axially inwardly offset adjacent its inner radial extremity to constitute a flange beyond said offset portion, said offset portion being seated upon the main body of the hub shell and the flange of the wheel body abutting the flange of the hub shell.

3. An artillery wheel comprising a metal wheel body and a hub shell comprising an axially extending main body and a radially inwardly extending securing flange, said wheel body being axially inwardly offset adjacent its inner radial extremity to constitute a flange beyond said offset portion, said wheel body being secured directly to said hub shell in both radial and axial planes.

4. An artillery wheel comprising a metal wheel body and a demountably secured hub shell comprising an axially extending main body and a radially inwardly extending securing flange, said wheel body being axially inwardly offset adjacent its inner radial extremity to constitute a flange beyond said offset portion, said offset portion being seated upon the main body of the hub shell and secured thereto, and the flange of the wheel body abutting the flange of the hub shell.

In testimony whereof I hereunto affix my signature.

GEORGE B. REED.